(12) United States Patent
Benn et al.

(10) Patent No.: US 7,898,212 B2
(45) Date of Patent: Mar. 1, 2011

(54) PORTABLE SOLAR GENERATOR

(76) Inventors: William M. Benn, San Diego, CA (US); John T. Benn, San Diego, CA (US)

(*) Notice: Subject to any disclaimer, the term of this patent is extended or adjusted under 35 U.S.C. 154(b) by 0 days.

(21) Appl. No.: 12/372,434

(22) Filed: Feb. 17, 2009

(65) Prior Publication Data

US 2010/0060229 A1  Mar. 11, 2010

Related U.S. Application Data

(63) Continuation of application No. 10/116,857, filed on Apr. 5, 2002, now Pat. No. 7,492,120, which is a continuation-in-part of application No. 09/828,114, filed on Apr. 6, 2001, now Pat. No. 6,396,239.

(51) Int. Cl.
  *H02J 7/00* (2006.01)
  *H01M 10/44* (2006.01)
  *H01M 10/46* (2006.01)
  *F24J 2/38* (2006.01)
  *F24J 2/00* (2006.01)
  *H01L 35/02* (2006.01)

(52) U.S. Cl. ............... 320/101; 320/138; 320/139; 126/574; 126/577; 126/573; 136/242; 136/243

(58) Field of Classification Search ............. 320/101, 320/138, 139; 318/558; 136/206, 242, 243; 126/573, 574, 577, 569, 578
See application file for complete search history.

(56) References Cited

U.S. PATENT DOCUMENTS

| | | | | |
|---|---|---|---|---|
| 4,261,329 A | * | 4/1981 | Walsh et al. | 126/569 |
| 4,421,943 A | * | 12/1983 | Withjack | 136/246 |
| 5,850,762 A | * | 12/1998 | Kochanneck | 74/490.03 |
| 5,851,309 A | * | 12/1998 | Kousa | 136/248 |
| 5,852,353 A | * | 12/1998 | Kochanneck | 318/558 |
| 5,969,501 A | * | 10/1999 | Glidden et al. | 320/101 |
| 6,923,174 B1 | * | 8/2005 | Kurz | 126/698 |

* cited by examiner

*Primary Examiner*—Edward Tso
*Assistant Examiner*—Alexis Boateng
(74) *Attorney, Agent, or Firm*—John R. Ross; John R. Ross, III

(57) ABSTRACT

A portable PV modular solar generator. A plurality of wheels are attached to the bottom of a rechargeable battery container. At least one rechargeable battery is contained inside the rechargeable battery container. A power conditioning panel is connected to the rechargeable battery container. At least one photovoltaic panel is pivotally connected. In a preferred embodiment, the rechargeable battery container is a waterproof battery enclosure having a knife switch connection. A mast having a rotation bar is supported by the waterproof battery enclosure. At least one solar panel support brace for supporting the photovoltaic panel is attached to the rotation bar. The power conditioning panel is waterproof, is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable or receiving auxiliary power inputs.

27 Claims, 12 Drawing Sheets

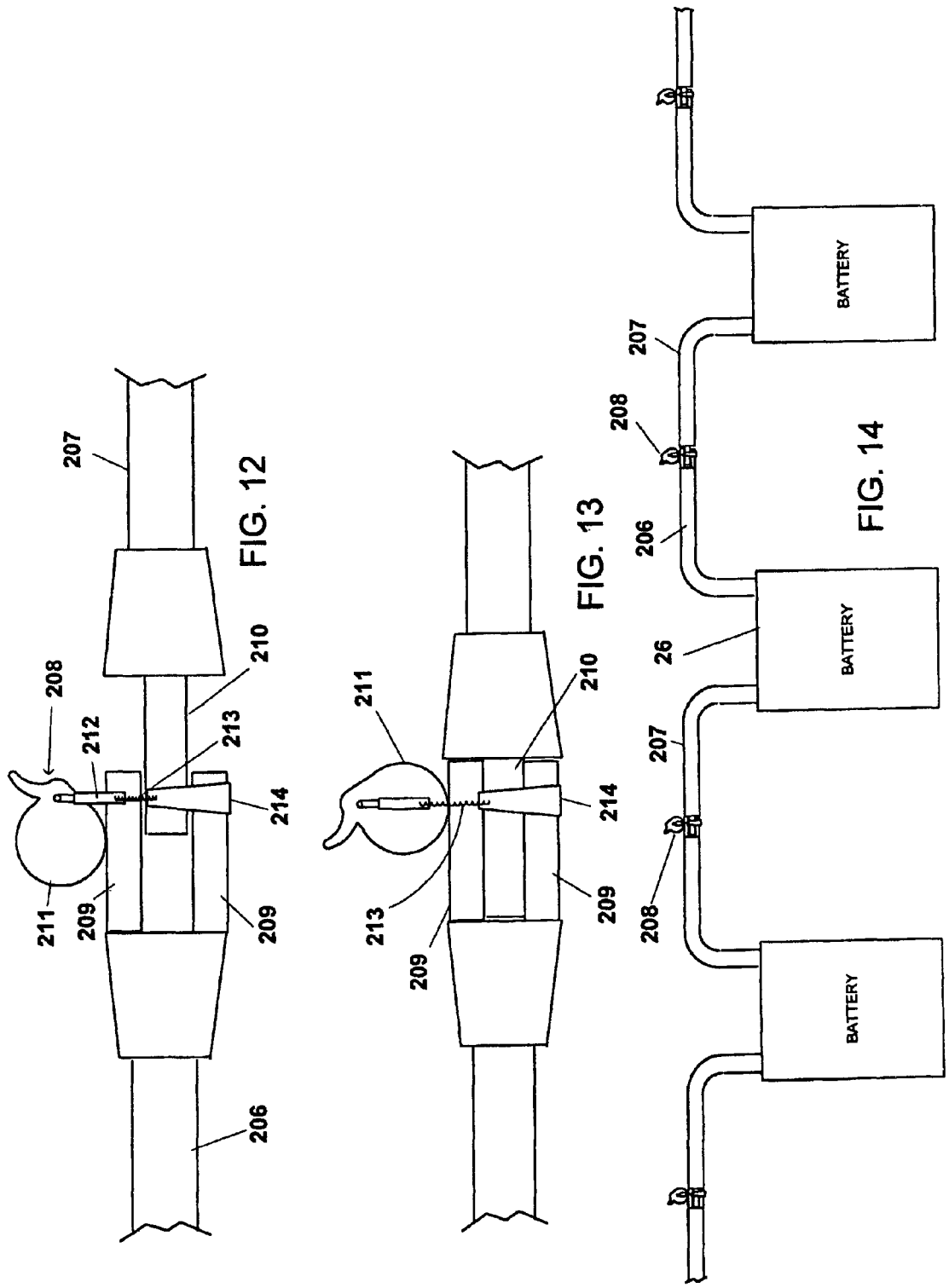

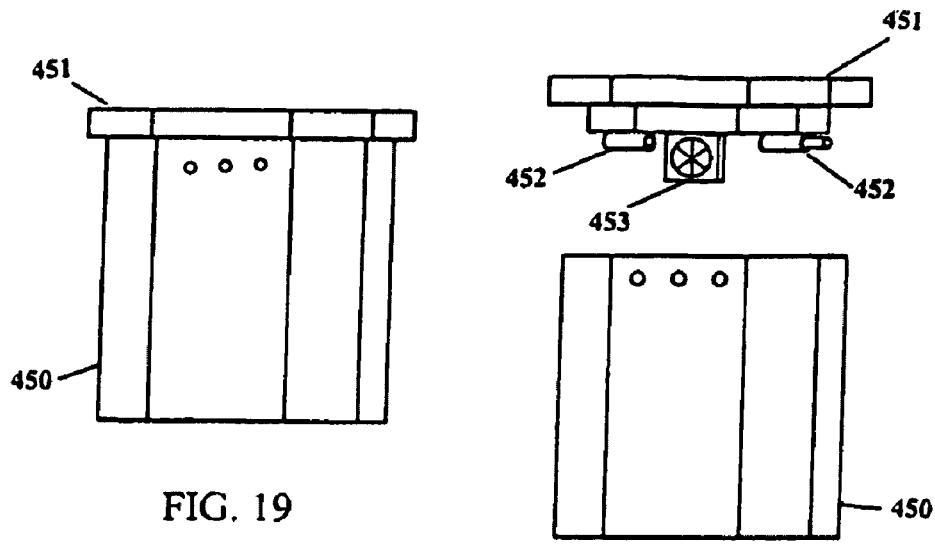
FIG. 19
FIG. 20
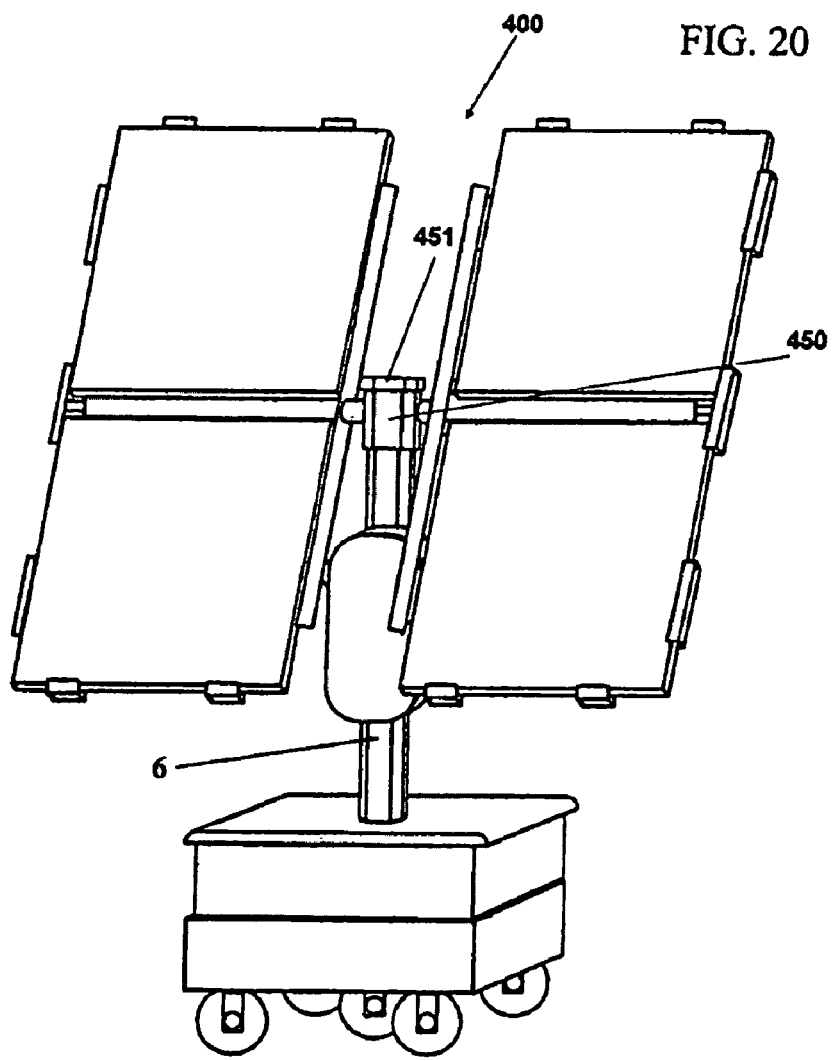
FIG. 21

PORTABLE SOLAR GENERATOR

The present invention relates to solar electric generators, and in particular, to portable solar electric generators. This application is a continuation of Ser. No. 10/116,857, filed Apr. 5, 2002, now U.S. Pat. No. 7,492,120, issue date Feb. 17, 2009; which is a continuation-in-part of Ser. No. 09/828,114, filed Apr. 6, 2001, now U.S. Pat. No. 6,396,239, issue date May 28, 2002; both of which are incorporated herein by reference.

BACKGROUND OF THE INVENTION

In recent years, the cost of generating electricity has increased dramatically. In California, the monthly electric bill for many consumers has more than doubled in the past year. Rolling blackouts, a condition in which geographical sections of the community are alternately cut-off from receiving electricity during an electrical shortage crisis, are becoming increasingly commonplace. As our planet's natural resources are depleted and as population increases, the importance of effectively harnessing alternative methods of generating electricity has increased.

Solar Energy

Photovoltaic panels (also called solar panels) are well known and are used to generate electricity from sunlight. Sunlight is "free" and so the cost of electricity generated by a photovoltaic panel is extremely low. However, solar energy is not widely used to generate electricity for residences because of the expense associated with installing a solar energy system onto a residence. Typically, photovoltaic panels are currently fixedly attached to the roof of a house and wired directly into the home's electrical system. Some disadvantages include the fact that the roof may not be the optimum location on the home owner's property to receive the best, most direct sunlight. Also, once the system is installed, it is permanent. In other words, if the homeowner moves to a new home, he cannot take the solar generating system with him. Also, it is extremely expensive to install a roof mounted solar generating system. Current estimates range from $20,000 to $30,000.

Prior Art Portable System

U.S. Pat. No. 6,201,181, issued to Azzam, discloses a portable modular solar cart. However, the cart disclosed by Azzam is inadequate for effectively supplying enough energy to satisfy the needs of a typical residence.

What is needed is a better portable solar generator.

SUMMARY OF THE INVENTION

The present invention provides a portable PV modular solar generator. A plurality of wheels are attached to the bottom of a rechargeable battery container. At least one rechargeable battery is contained inside the rechargeable battery container. A power conditioning panel is connected to the rechargeable battery container. At least one photovoltaic panel is pivotally connected. In a preferred embodiment, the rechargeable battery container is a waterproof battery enclosure having a knife switch connection. A mast having a rotation bar is supported by the waterproof battery enclosure. At least one solar panel support brace for supporting the photovoltaic panel is attached to the rotation bar. The power conditioning panel is waterproof, is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable or receiving auxiliary power inputs.

BRIEF DESCRIPTION OF THE DRAWINGS

FIGS. 12-14 show another preferred embodiment of the present invention.

FIGS. 19-21 show another preferred embodiment of the present invention.

DETAILED DESCRIPTIONS OF THE PREFERRED EMBODIMENTS

Figure 1:
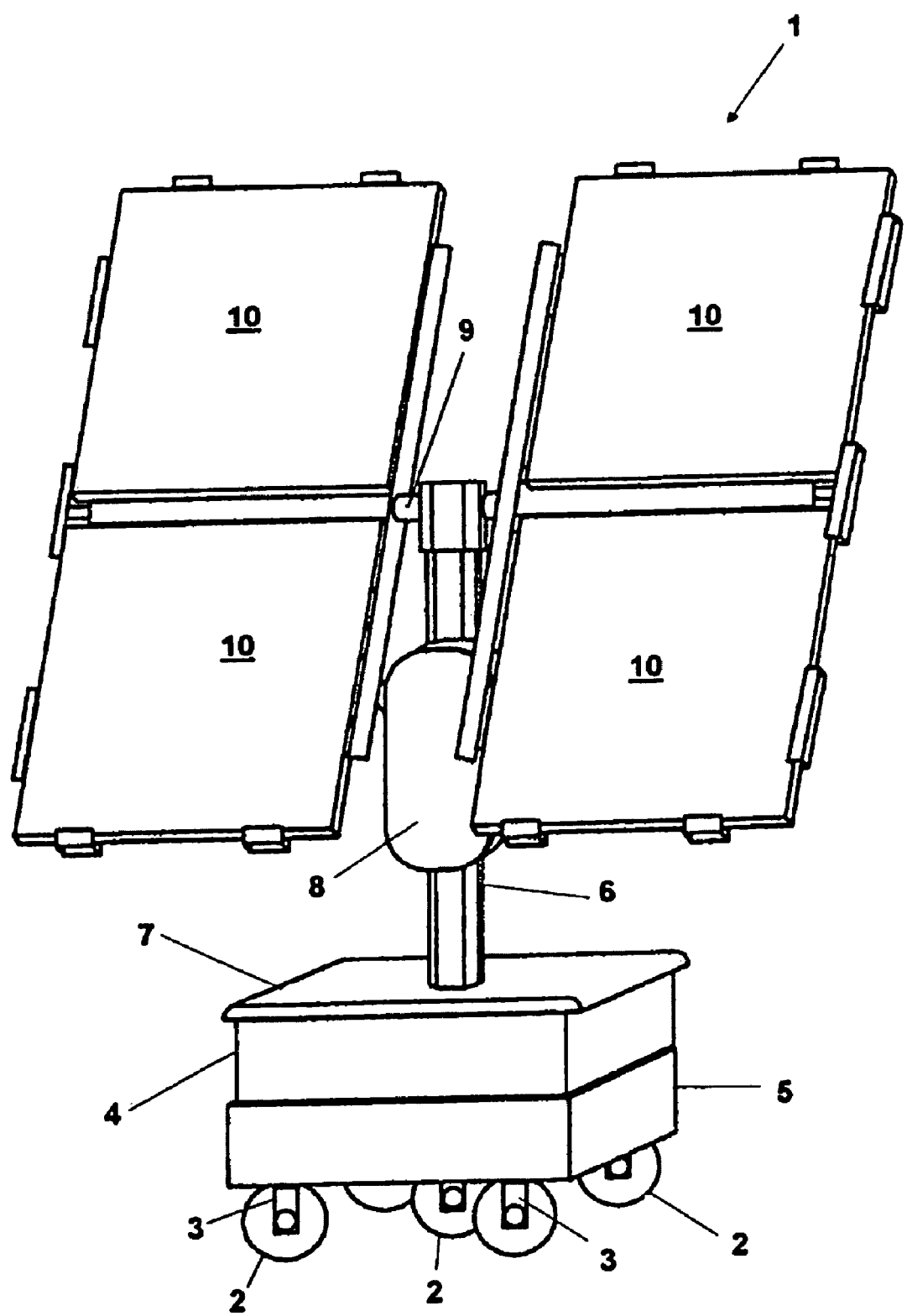
FIG. 1 shows a preferred embodiment of the present invention.

FIG. 1 shows a perspective view of a preferred embodiment of the present invention. Five wheels 2 are rotatably mounted on wheel supports 3 of photovoltaic modular platform 1. Wheel supports 3 are pivotally mounted to the bottom of battery enclosure carriage 5. Battery enclosure 4 is inserted inside battery enclosure carriage 5. Mast 6 extends upward through the center of battery enclosure 4. Power conditioning panel 8 is rigidly attached to the side of mast 6. Rotation bar 9 is rotatably connected to the top of mast 6 and is capable of rotatably positioning solar panels 10 at various angles. It is estimated that in a preferred embodiment, modular platform 1 (having 16 lead acid batteries weighting 60 lbs each and having 4 solar panels 10 weighing 25 lbs each) weighs less than approximately 1200 lbs.

Battery Enclosure

Figure 2:
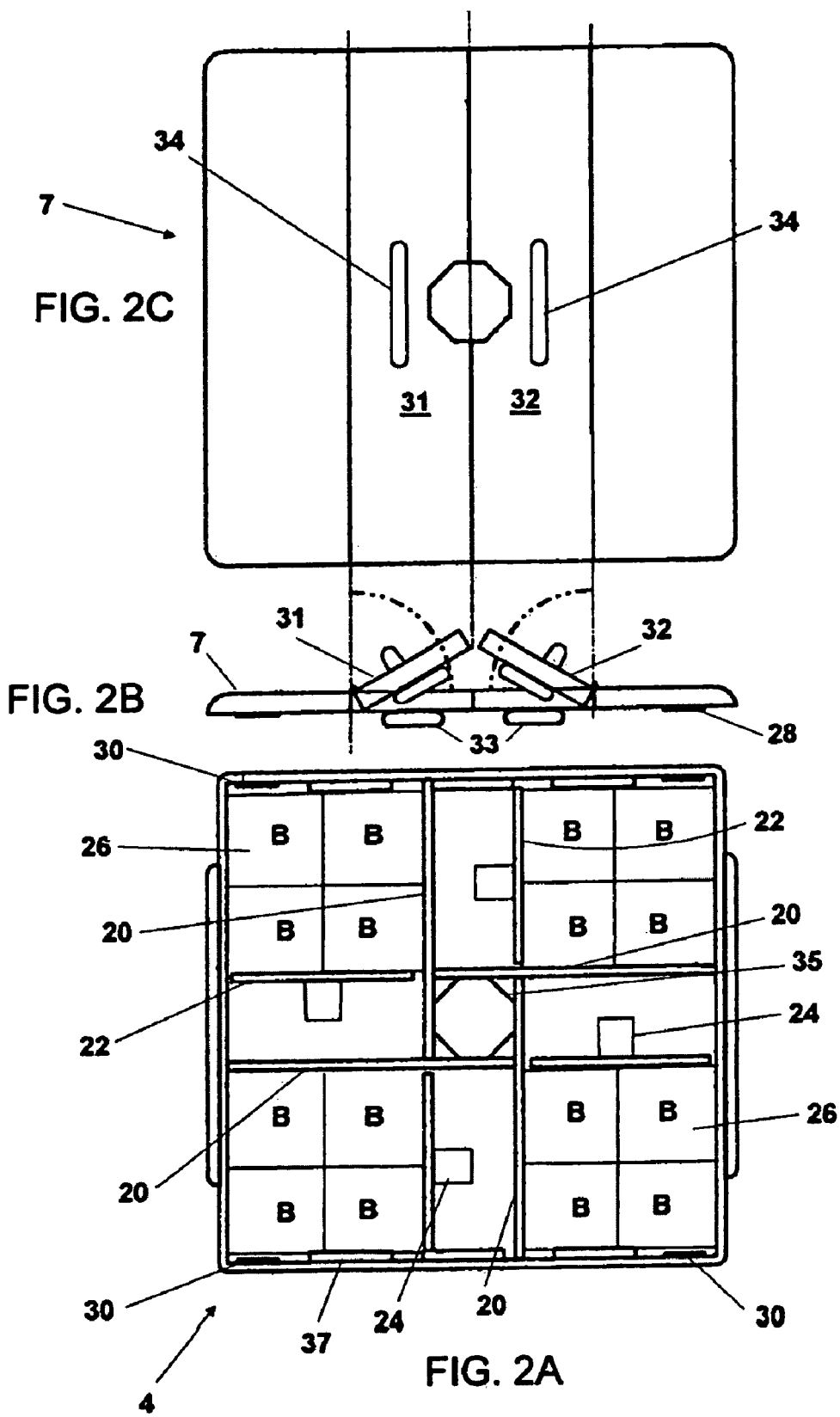
FIG. 2A shows a preferred battery enclosure.
FIGS. 2B and 2C show a preferred battery enclosure lid.

A top view of the interior of battery enclosure 4 is shown in FIG. 2A. Battery enclosure 4 contains four fixed walls 20 rigidly attached to battery enclosure 4. Four moveable walls 22 are slidingly mounted to tracks 24 and are each capable of being locked in position along track 24. Four lead acid batteries are arranged adjacent to each other in the corners of battery enclosure 4. Moveable walls 22 are slid along tracks 22 and then locked in place so that batteries 26 are held flush against one another. Battery enclosure 4 also has mast support cutout section 35 to provide support for mast 6 (FIG. 1).

FIG. 2B shows a side view and FIG. 2C shows a top view of battery enclosure lid 7. Lid connector extensions 28 are arranged to properly align lid 7 over battery enclosure 4 when lid connector extensions 28 are inserted into slots 30. By lifting up on handles 34, hinged sections 31 and 32 of lid 7 can be opened. When sections 31 and 32 are raised knife switch connections 33 are broken (see also FIG. 8). Wires (not shown) leading to and from batteries 26 are run through battery raceways 37. In the preferred embodiment, after lid 7 is placed on battery enclosure 4, battery enclosure 4 is waterproof.

Deployment of PV Panels

Figure 3:
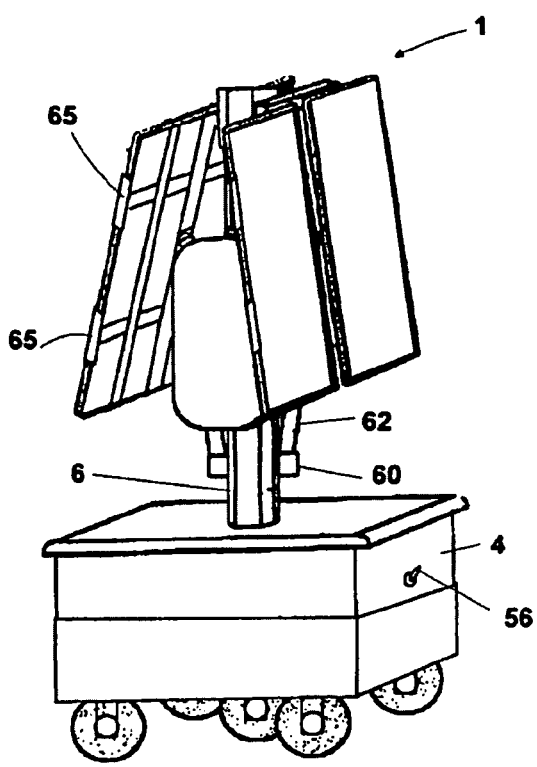
FIG. 3 shows a preferred embodiment in its non-deployed position

FIG. 3 shows a perspective view of PV modular platform 1 in its non-deployed state. It is preferable to have modular platform 1 in the position shown in FIG. 1 when deploying it to different locations at a specific site. As stated above, in the preferred embodiment modular platform 1 weighs less than approximately 1200 lbs. At this weight, it is estimated that one adult male of average strength can easily move it on a flat grade fully loaded with batteries by leaning against battery enclosure 4 with both hands and pushing. If modular platform 1 needs to be moved to a position uphill or over a rough grade, the batteries and PV panels 10 can be temporarily removed and modular platform 1 can be easily pushed uphill or over a rough grade. The weight of modular platform 1 without batteries 26 or PV panels 10 is approximately 100 lbs.

Figure 4:
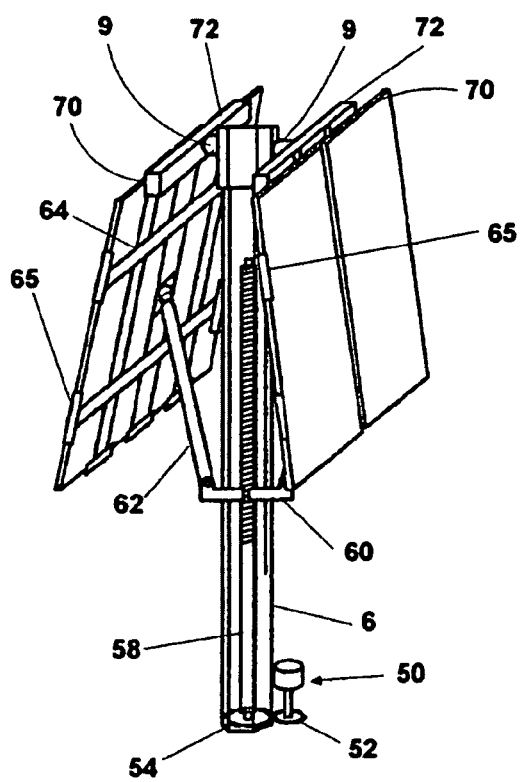
FIG. 4 shows a detailed view of the mast shown in FIG. 3.
Figure 5:
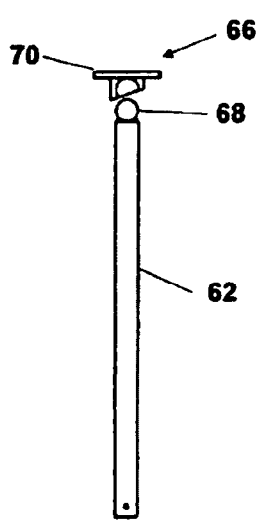
FIG. 5 shows details of a ball and socket joint.
Figure 6:
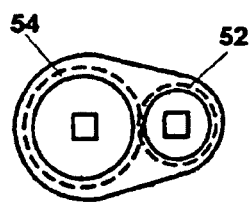
FIG. 6 shows details of gears shown in FIG. 4.

FIG. 4 shows a cut out view of mast 6. DC motor 50 is engaged with gear 52, which is engaged with gear 54. A detail view of gears 52 and 54 are shown in FIG. 6. By switching switch 56 (FIG. 3) to "on", DC motor 50 is started. This causes gear 52 to turn gear 54, which turns erector screw 58. Erector arm support 60 is threaded onto erector screw 58 so that when erector screw 58 is turned, erector arm support 60 is raised. Erector arm 62 is connected to solar panel support brace 64 via ball and socket joint 66. Erector arm 62 and ball 68 and socket 70 of ball and socket joint 66 is shown in detail in FIG. 5. Socket 70 is also shown attached to solar panel support brace 64 in FIG. 9.

Solar Panel Support Braces

Figure 9:
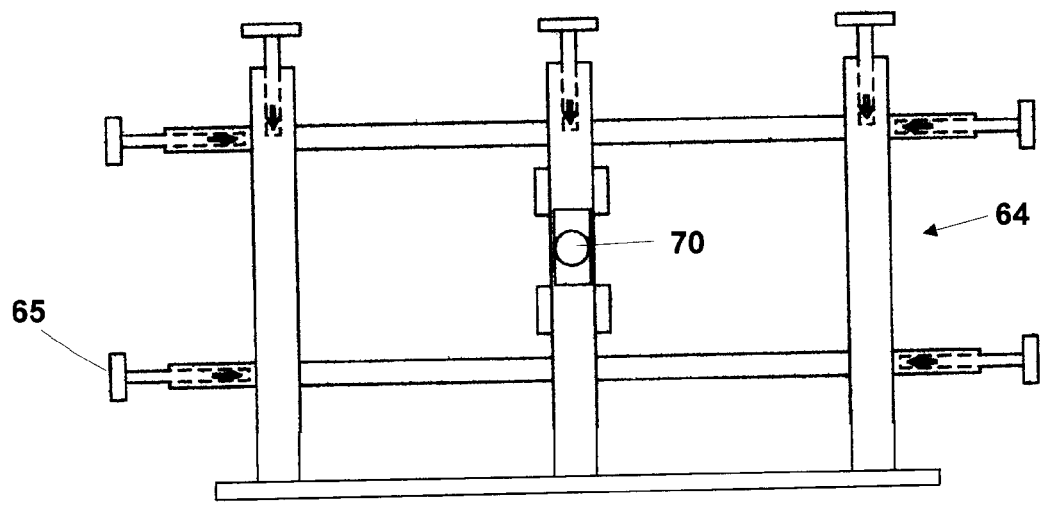
FIGS. 9 and 10 show a preferred solar panel support brace.
Figure 10:
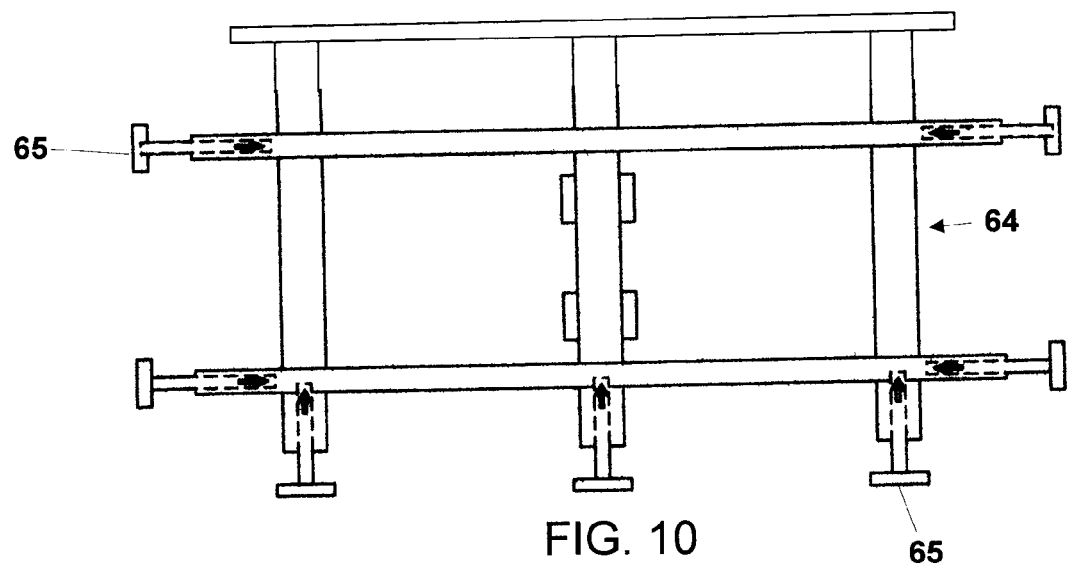

FIG. 9 shows a bottom view and FIG. 10 shows a top view of solar panel support braces 64. Solar panels 10 are held in place on solar panel support braces 64 by spring loaded clamps 65. Solar panel support braces 64 (FIG. 4) are connected to support bars 72 at a hinge at connection points 70. Support bars 72 are rigidly connected to rotation bar 9. As erector screw 58 raises erector arm support 60, erector arms 62 push upward on solar panel support braces 64 causing them to raise and pivot about connection points 70.

Figure 7:
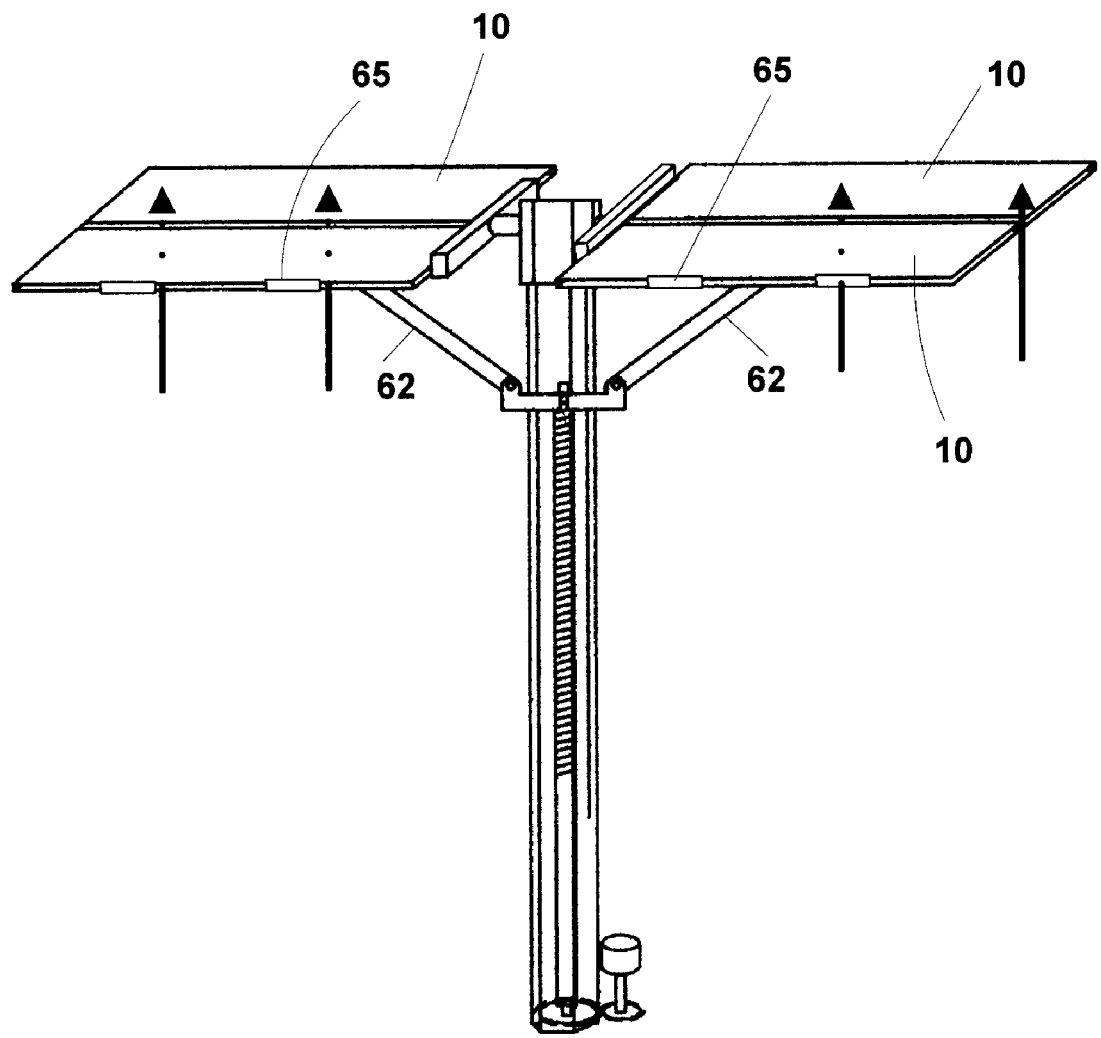
FIG. 7 shows a preferred embodiment in its erected position.

When erector arm support 60 is fully raised, solar panel support braces 64 will be in the erected position shown in FIG. 7. By manually pressing upward on solar panel support braces 64 at a position shown by the arrows in FIG. 7, solar panels 10 will easily rotate about the axis of rotation bar 9 to the deployed position shown in FIG. 1.

Electrical Components

Figure 8:
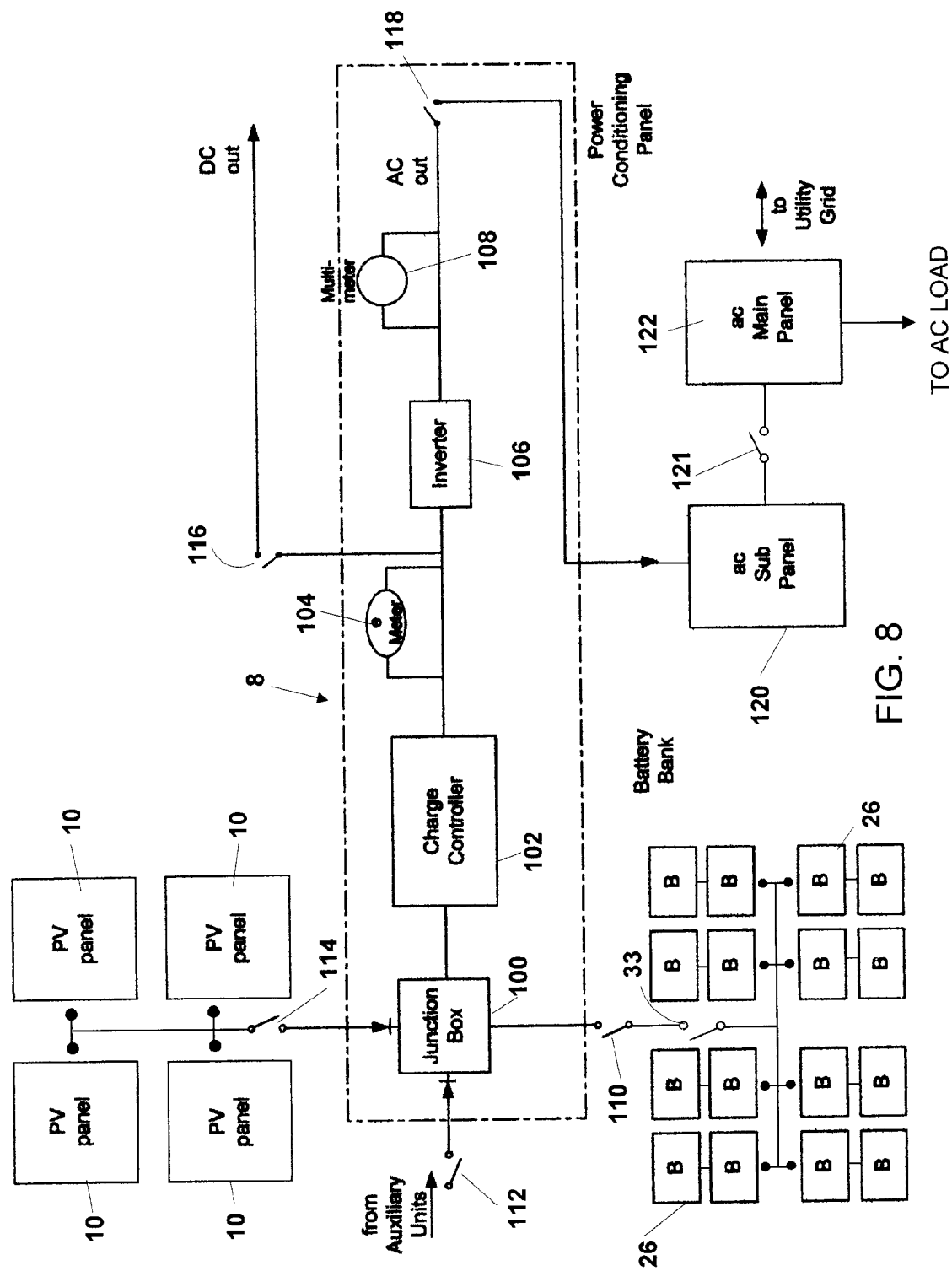
FIG. 8 shows a simplified drawing of the electrical components of the preferred embodiment.

The electrical components of the preferred embodiment of the present invention are shown in FIG. 8. Preferably, junction box 100, charge controller 102, DC volt meter 104, inverter 106, and AC multimeter 108 are all contained within power conditioning panel 8. In the preferred embodiment, power conditioning panel 8 (also shown in FIG. 1) is waterproof.

PV panels 10 and batteries 26 are connected to junction box 100. In a preferred embodiment each PV panel 10 is capable of generating approximately 120 watts of electricity when impacted by direct sunlight. In the preferred embodiment, junction box 100 can also receive DC electrical input from auxiliary power units. PV panels 10 are connected to junction box 100 through switch 114, batteries 26 are connected to junction box 100 through switch 110 and the auxiliary power units are connected to junction box 100 through switch 112. As a safety device, the preferred power conditioning panel 8 is configured to automatically open switches 114, 112 and 110 whenever the door of power conditioning panel 8 is opened, thereby preventing a potential mishap.

When sunlight strikes PV panels 10, electricity is generated and flows from PV panels 10 to junction box 100. Charge controller 102 monitors the condition of batteries 26 to ensure that they are not overcharged, or drained too much. If batteries 26 require further charging, electricity will be directed from junction box 100 to batteries 26 for charging. The current flow will pass through knife switch connection 33 (see also FIG. 2B) which is usually in the closed position.

DC electricity will flow from either PV panels 10 or batteries 26 through charge controller 102 where its level is preferably monitored by DC voltmeter 104. DC current can be routed to a DC load by closing switch 116. Electricity then flows through inverter 106 where the current is converted to AC. Preferably multimeter 108 monitors the level of AC current. AC current then flows through switch 118 (normally closed) to AC sub panel 120.

AC sub panel 120 is configured so that electricity coming from power conditioning panel 8 can be routed to specific areas within the AC load. For example, if the AC load is a residence the residence owner may decide that he wants to power his kitchen using electricity generated by PV modular platform 1. The owner can then close the breaker within AC sub panel 120 representing the kitchen. Electricity will then flow from AC sub panel 120 through safety switch 121 through AC sub panel 122 where it will be directed to the kitchen. To save money spent on purchasing electricity supplied through the utility grid, the owner can then open the breaker in AC main panel 122 from the utility grid for the kitchen. In this instance, the kitchen would be getting its entire electrical needs from PV modular platform 1 and not from the utility grid.

In the first preferred embodiment, PV panels 10 are wired in parallel (see FIG. 8). In the first preferred embodiment, PV panels 10 are 12 volt solar panels that can provide approximately 120 watts of power, so when wired in parallel they will provide a total of 480 watts at 12 volts DC. In the first preferred embodiment lead acid batteries 26 are low cost 6 volt lead acid batteries. As shown in FIG. 8, these are wired in series, in sets of two, to provide a 12 volt DC output. The sets of two are then wired in parallel. Typical energy stored in these individual sets of batteries is 350 amp-hours per set of two. Therefore, with 8 sets the storage capacity will be approximately 2800 amp-hours.

Second Preferred Embodiment

In the first preferred embodiment, PV modular platform was shown as a single power generation unit. In the second preferred embodiment, two auxiliary PV modular platforms are added to a main PV modular platform 1. The auxiliary PV modular platform is similar in design to PV modular platform 1 described above with the exception that the auxiliary PV modular platform preferably does not contain an inverter. The inverter is unnecessary because the DC current from the auxiliary unit will feed directly into the main PV modular platform 1 at via switch 112 (FIG. 8).

By connecting two auxiliary PV modular platforms to PV modular platform 1, the entire system can provide approximately 1.2 kilowatts, this is enough to power a house. It is estimated that the total purchase price for two auxiliary PV modular platforms and a main PV modular platform is approximately $11,000. If the current monthly electric bill for a residential electricity user is $300/month, it will take slightly more than three years before a purchaser of the second preferred embodiment recovers his cost.

Third Preferred Embodiment

Figure 11:
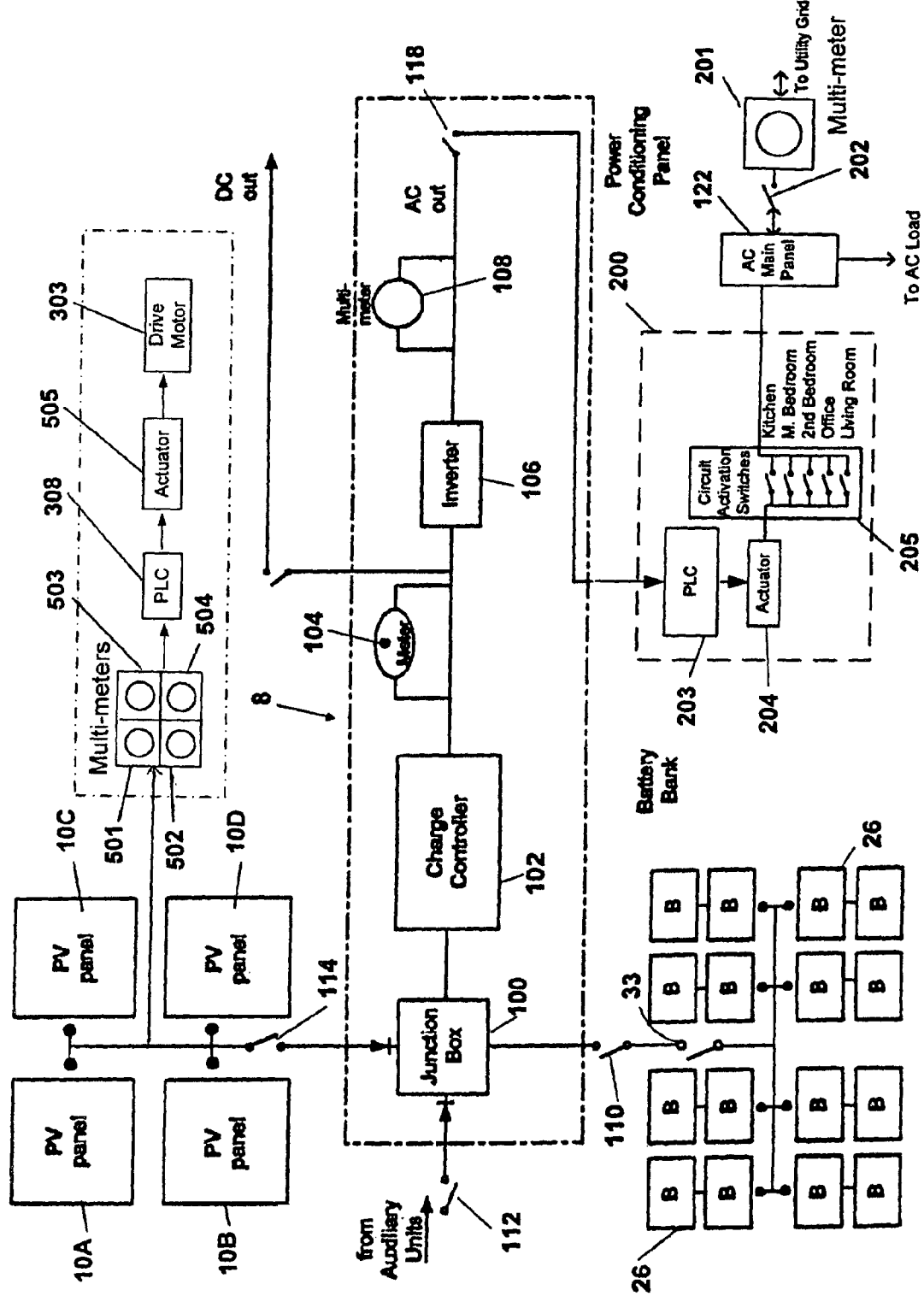
FIG. 11 shows another preferred embodiment of the present invention.

A third preferred embodiment is shown in FIG. 11. The third preferred embodiment is similar to the embodiment shown in FIG. 8, except that AC sub panel 120 is replaced with programmable circuit selection panel 200.

Programmable Logic Controller (PLC)

PLC 203 is programmed to monitor the utility grid. Multimeter 201 reports the status of the utility grid to PLC 203. If the utility grid is not energized (i.e., no current is detectable from the utility grid), PLC 203 opens switch 202. Modular platform 1 (FIG. 1) then becomes disconnected from the utility grid so that it operates as a stand alone power supply system to the load. PLC 203 will continue to monitor the status of the utility grid. Once PLC 203 determines the utility grid is back on line, PLC 203 will close switch 202 so that AC monitor panel 122 is once again receiving inputs from both modular platform 1 and the utility grid.

Programmable Circuit Selection Panel

Programmable circuit selection panel 200 includes PLC 203, actuator 204, and circuit activation switches 205. PLC 203 includes a programmable time select variable control parameter that is entered by the user as an input to PLC 203. The time select control parameter allows PLC 203 to automatically select and deselect circuit activation switches 205 based on the time of day. This, in turn, allows programmable circuit selection panel 200 to be programmed for maximum energy efficiency.

Based on inputs received from PLC 203, actuator 204 will open or close circuit activation switches 205. For example, as shown in FIG. 11, circuit activation switches 205 include individual switches for the kitchen, the master bedroom, the second bedroom, the office and the living room. Table 1 shows a typical preferred programmed scheme for PLC 203 to open or close circuit activation switches 205 based on the time of day.

TABLE 1

|  | Kitchen | Master Bd. | Second Bd. | Office | Living Room |
| --- | --- | --- | --- | --- | --- |
| 12:00 AM | Open | Closed | Closed | Closed | Closed |
| 1:00 AM | Open | Closed | Closed | Closed | Closed |
| 2:00 AM | Open | Closed | Closed | Closed | Closed |
| 3:00 AM | Open | Closed | Closed | Closed | Closed |
| 4:00 AM | Open | Closed | Closed | Closed | Closed |
| 5:00 AM | Open | Closed | Closed | Closed | Closed |
| 6:00 AM | Closed | Closed | Closed | Open | Open |
| 7:00 AM | Closed | Open | Open | Open | Open |
| 8:00 AM | Closed | Open | Open | Open | Open |
| 9:00 AM | Open | Open | Open | Closed | Closed |
| 10:00 AM | Open | Open | Open | Closed | Closed |
| 11:00 AM | Closed | Open | Open | Closed | Closed |
| 12:00 PM | Closed | Open | Open | Closed | Closed |
| 1:00 PM | Closed | Open | Open | Closed | Closed |

TABLE 1-continued

|  | Kitchen | Master Bd. | Second Bd. | Office | Living Room |
| --- | --- | --- | --- | --- | --- |
| 2:00 PM | Open | Open | Open | Closed | Closed |
| 3:00 PM | Open | Open | Open | Closed | Closed |
| 4:00 PM | Open | Open | Open | Closed | Closed |
| 5:00 PM | Open | Open | Open | Closed | Closed |
| 6:00 PM | Closed | Open | Open | Closed | Closed |
| 7:00 PM | Closed | Open | Open | Closed | Closed |
| 8:00 PM | Open | Closed | Closed | Closed | Closed |
| 9:00 PM | Open | Closed | Closed | Closed | Closed |
| 10:00 PM | Open | Closed | Closed | Closed | Closed |
| 11:00 PM | Open | Closed | Closed | Closed | Closed |

Fourth Preferred Embodiment

A fourth preferred embodiment of the present invention is shown in FIGS. 12-14. In the fourth preferred embodiment battery cables 206 and 207 are connected to each other by utilization of quick release connection device 208.

Attached to the end of cable 206 are female connection prongs 209. Attached to the end of cable 207 is male connection prong 210. As shown in FIG. 12, male prong 210 is inserted partway between female prongs 209. Cam clip 211 is in the position shown in FIG. 12. Cam tension adjustment nut 212 (which includes spring 213) is pivotally connected to cam clip 211. Spring 213 is relaxed and connects cam tension adjustment nut 212 to cam tension adjustment strap 214.

In FIG. 13, male prong 210 has been inserted further into female prongs 209. Cam clip 211 has been rotated upward. Spring 213 is now under tension causing cam clip 211 and cam tension adjustment strap 214 to exert a compressive force on female prongs 209. Male prong 210 is now securely squeezed between female prongs 209. To remove male prong 210 from female prongs 209, the user rotates cam clip downward so that it is in the position shown in FIG. 12.

FIG. 14 shows lead acid batteries 26 connected utilizing quick release connection device 208.

Fifth Preferred Embodiment

A fifth preferred embodiment is shown in FIGS. 15-17, and FIG. 11. In the fifth preferred embodiment, drive housing section 302 is rigidly attached to the bottom of battery enclosure carriage 5. FIG. 16A shows a top see-through view of drive housing section 302. Drive housing section 302 houses drive motor 303. Drive motor 303 drives wheels 304 and wheels 305, which are each connected by treads 306 and 307, respectively.

Figure 15:
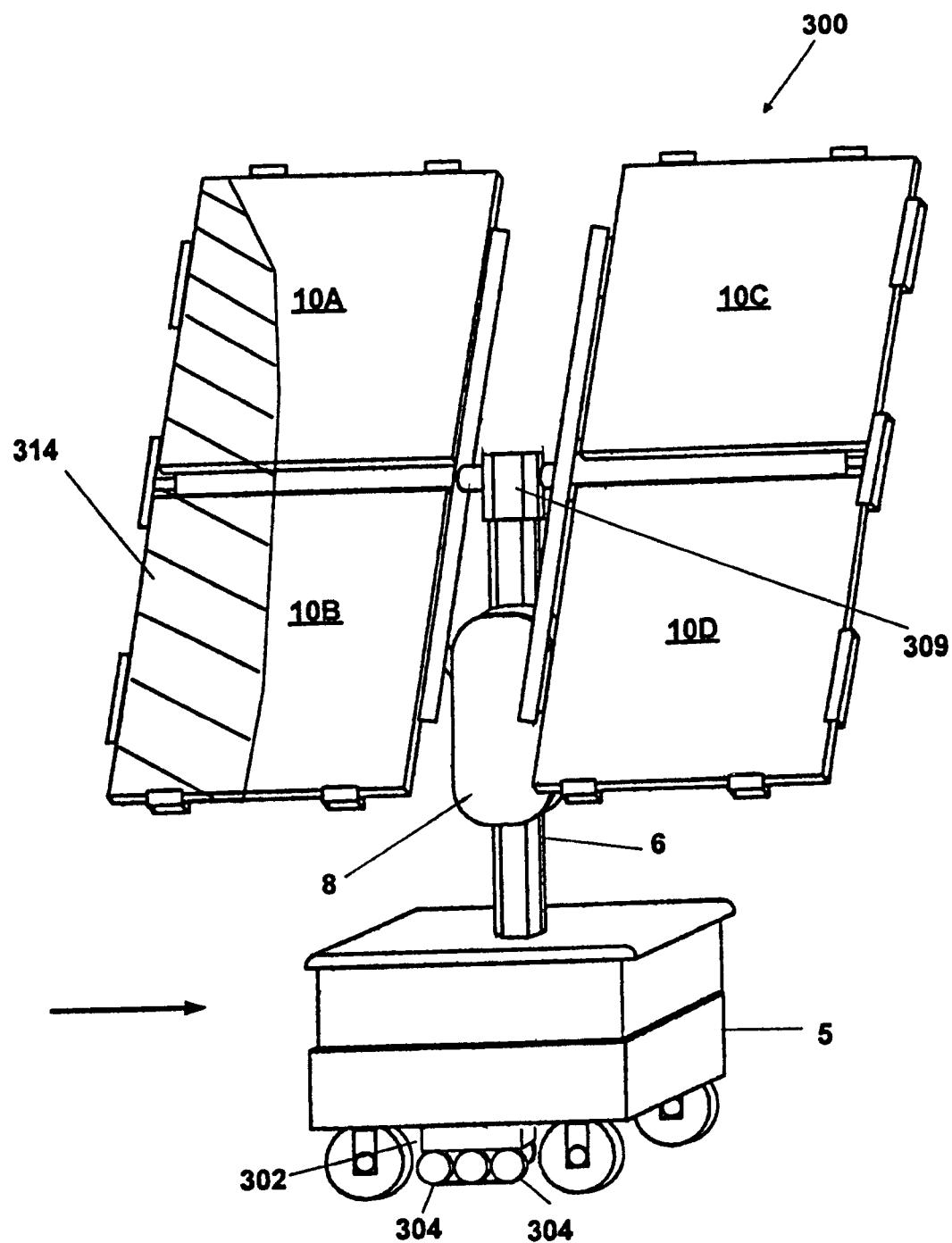
FIGS. 15-17 show another preferred embodiment of the present invention.

As shown in FIG. 11, PV panels 10A-10D are each monitored by multi-meters 501-504, respectively. PLC 308 (FIG. 11) is in electrical contact multi-meters 501-504 and actuator 505. Actuator 505 controls drive motor 303. In a preferred embodiment, PLC is housed inside power conditioning panel 8 (FIG. 15).

In the fifth preferred embodiment, the repositioning of modular platform 300 (FIG. 15) is controlled with remote control unit 301 (FIG. 17) utilizing three preferred options. Remote control unit 301 utilizes a RF transceiver to remotely communicate with drive motor 303.

Manual Repositioning

Modular platform 300 can be repositioned manually by hand. To manually reposition modular platform 300, the operator moves indicator 310 (FIG. 17) so that it is pointed to position "M". This causes wheels 304 and 305 to become disengaged so that they are in a freewheeling state. Modular platform 300 can then be physically moved by hand.

For example, FIG. 15 shows PV panels 10A and 10B partially covered by shaded region 314. To position modular platform 300 physically by hand so that it is fully in the sun, the operator pushes it in the direction indicated by the arrow.

Remote Control

Remote control unit 301 can directly control the positioning of modular platform 300. To remotely control the positioning of modular platform 300, the operator moves indicator 310 (FIG. 17) so that it is pointed to position "R".

Figure 16A:
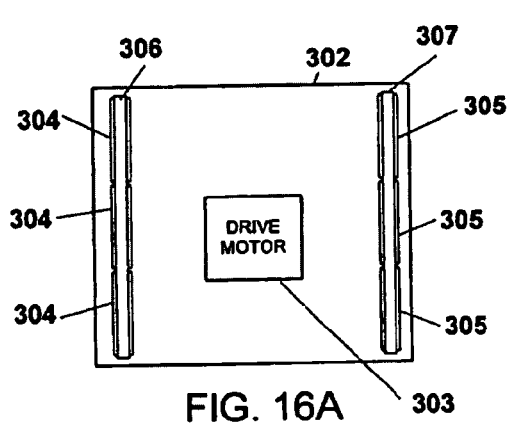
Figure 16B:
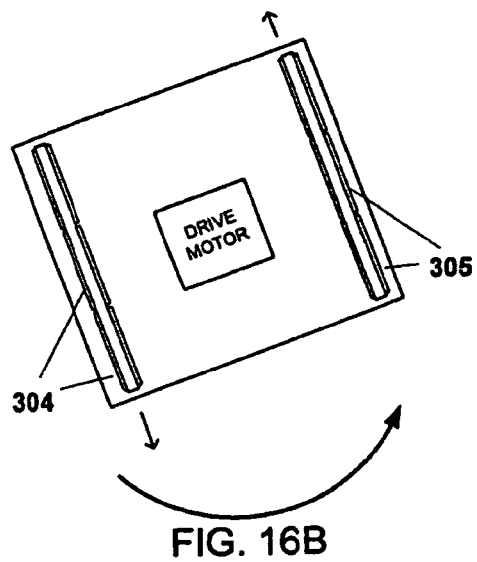

To cause modular platform 300 to pivot in a counterclockwise direction, the operator presses button 311. This causes wheels 304 to rotate forward and wheels 305 to rotate backward. FIG. 16B shows housing section 302 pivoting counterclockwise.

Figure 16C:
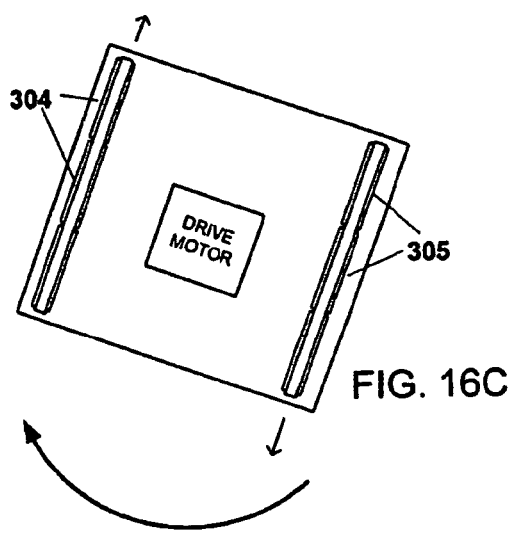

To cause modular platform 300 to pivot in a clockwise direction, the operator presses button 312. This causes wheels 304 to rotate backward and wheels 305 to rotate forward. FIG. 16c shows housing section 302 pivoting clockwise.

Figure 16D:
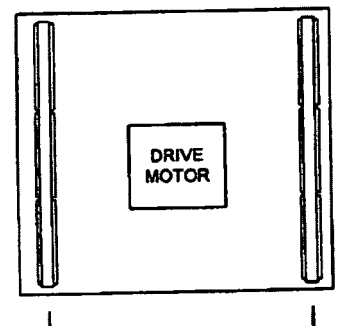
Figure 16E:
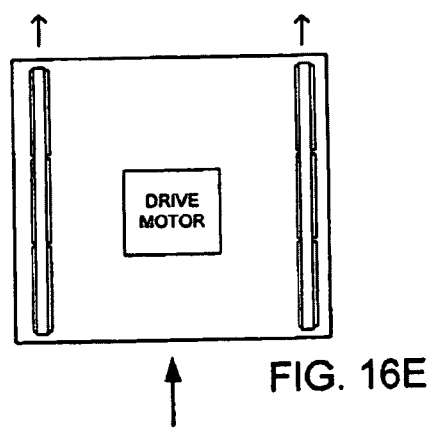

To cause modular platform 300 to move forward, the operator moves toggle switch 313 downward. This causes wheels 304 and wheels 305 to move forward. FIG. 16D shows housing section 302 moving forward.

Figure 17:
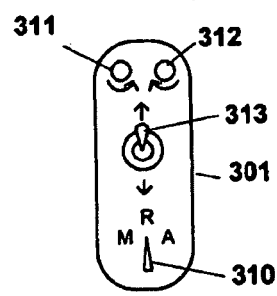

To cause modular platform 300 to move backward, the operator moves toggle switch 313 upward to the position shown in FIG. 17. This causes wheels 304 and wheels 305 to move backward. FIG. 16D shows housing section 302 moving backward.

For example, FIG. 15 shows PV panels 10A and 10B partially covered by shaded region 314. To position modular platform 300 utilizing remote control unit 301, the operator moves toggle switch 313 downward. This causes wheels 304 and wheels 305 to move forward so that modular platform 300 moves in the direction indicated by the arrow.

Automatic Positioning

Modular platform 300 can also be positioned automatically without any operator input. To place modular platform 300 in automatic mode, the operator moves indicator 310 (FIG. 17) so that it is pointed to position "A". After modular platform 300 is in automatic mode, solar energy generated by PV panels 10A-10D is measured by multi-meters 501-504. Values corresponding to the amount of solar energy generated by each panel is then sent to PLC 308. PLC 308 then computes the gradient of the energy between each of the panels and controls actuator 505 to activate drive motor 303 to reposition the unit so that it is located at an optimum position to receive sunlight.

For example, as shown in FIG. 15, PV panels 10C and 10D are receiving greater sunlight than panels 10A and 10B. PLC 308 computes the gradient of the energy between panels 10A-10D and sends a signal to drive motor 303 (FIG. 16A) to position modular platform 300 so that it moves in the direction indicated by the arrow (FIG. 15) until all panels are in direct sunlight.

Sixth Preferred Embodiment

Figures 18A, 18B:
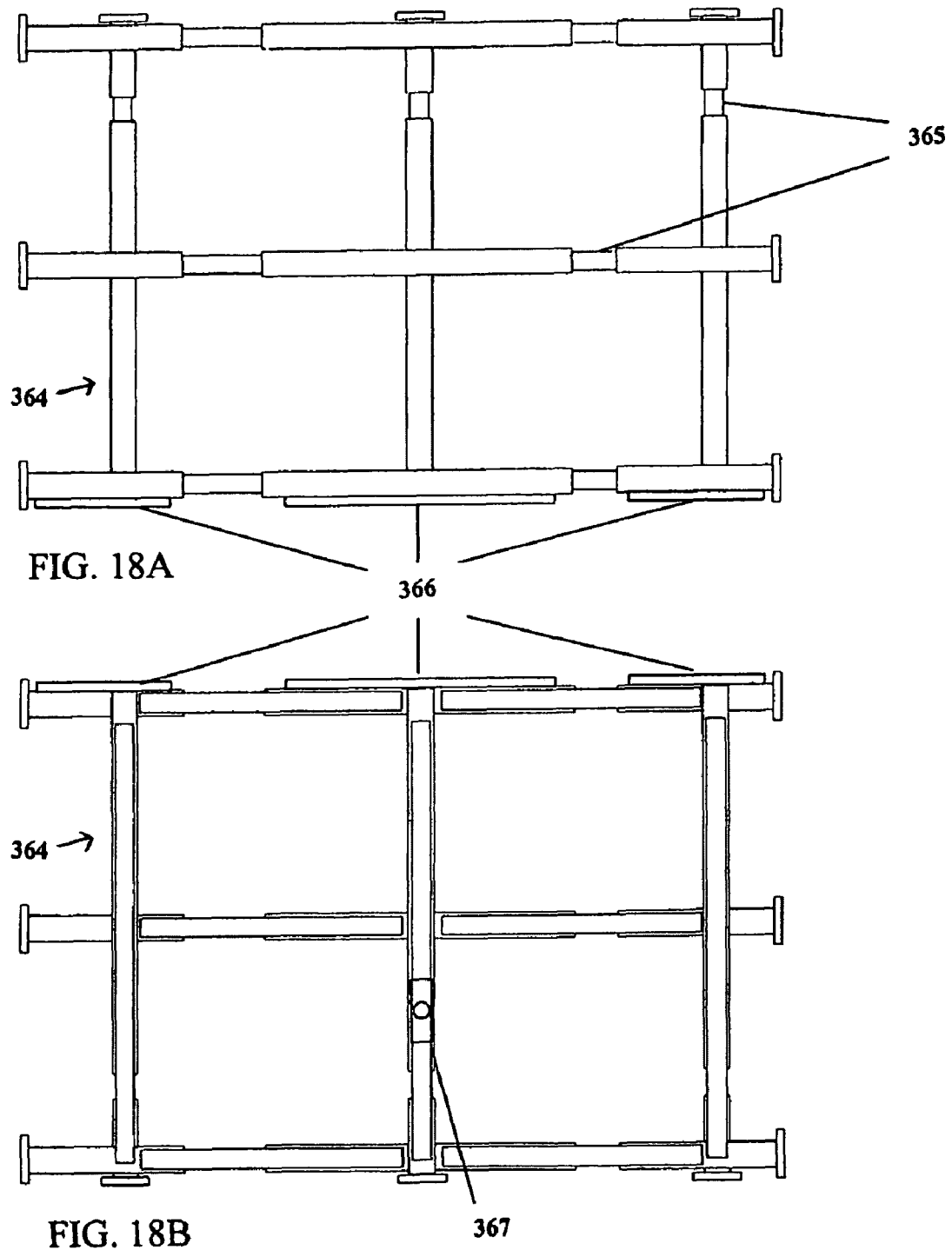
FIGS. 18A-18B show another preferred embodiment of the present invention.

A sixth preferred embodiment is shown in FIGS. 18A and 18B. FIG. 18B shows a bottom view and FIG. 18A shows a top view of solar panel support braces 364. Solar panels 10 are held in place on solar panel support braces 364 by spring loaded expansion bars 365. Solar panel support braces 364 are connected to support bars 72 (FIG. 4) via hinges 366. Ball and socket connector 367 is shown in FIG. 18B.

Seventh Preferred Embodiment

A seventh preferred embodiment is shown in FIGS. 19-21. FIG. 19 shows mast cap lid 451 on top of mast cap 450. FIG. 20 shows an exploded view of mast cap lid 451 and mast cap 450. FIG. 21 shows mast cap lid 451 and mast cap 450 attached to modular platform 400.

Mast 6 serves as a raceway for wiring for modular platform 400. Consequently, if mast cap lid 451 is removed during operation of modular platform 400, serious injury could result. Therefore, in the seventh preferred embodiment, mast cap lid 451 has been configured with solenoids 452 to act as electromagnetic locks. When electrical current is generated by the PV panels, a current is sent to solenoids 452. This activates the cylinders of the solenoids and injects them into mast cap 450 affecting a locked state between mast cap 450 and mast cap lid 451.

Also, in the seventh preferred embodiment, ventilation fan 453 is mounted on the underside of mast cap lid 451. Ventilation fan 453 provides ventilation for the entire mast when the internal circuitry is energized.

Some Advantages of the Present Invention

The compact size, flexibility, mobility and modularity of the present invention provides an easy to install and maintain device. The present invention is a significant benefit to the community. It provides an independent distributed power source that can eliminate power blackouts or brownouts for users.

Although the above-preferred embodiments have been described with specificity, persons skilled in this art will recognize that many changes to the specific embodiments disclosed above could be made without departing from the spirit of the invention. For example, although the second preferred embodiment discusses connecting the main PV modular platform to two auxiliary PV modular platforms, it is also possible to connect it to just one auxiliary PV modular platforms or more than two auxiliary PV modular platforms. Also, it is possible to have other devices capable of generating electricity connected to a main PV modular platform, such as a windmill or a fuel-burning generator. Also, although FIG. 8 showed PV panels 10 wired in parallel, they could also be wired in series. Also the batteries 26 could be wired in series or parallel depending on the application of the system. Also, although the above described embodiments showed lead acid batteries 26 charged by the present invention, the present invention could be used to charge fuel cells. Although the above embodiments discuss the utilization of programmable logic controllers, it would be possible to substitute a variety of types of programmed computers in place of the PLCs specifically mentioned. Therefore, the attached claims and their legal equivalents should determine the scope of the invention.

We claim:

1. A portable PV modular solar generator, comprising:
   A) a rechargeable battery container,
   B) a plurality of wheels attached to the bottom of said rechargeable battery container,
   C) at least one rechargeable battery contained inside said rechargeable battery container,
   D) a power conditioning panel connected to said rechargeable battery container, and
   E) at least one pivotally connected photovoltaic panel, wherein said portable PV modular solar generator has automatic positioning capability.

2. The portable PV modular solar generator as in claim 1, wherein said portable PV modular solar generator supplies energy to at least one AC main panel, wherein said AC main panel receives generated energy from a utility grid, wherein said portable PV modular solar generator further comprises a computer for monitoring the status of said utility grid, wherein said computer is capable of disconnecting said utility grid from said AC main panel when said utility grid is not energized and said computer is capable of connecting said utility grid to said AC main panel when said utility grid is energized.

3. The portable PV modular solar generator as in claim 1, further comprising a programmable circuit selection panel.

4. The portable PV modular solar generator as in claim 3, wherein said programmable circuit selection panel comprises:
A) a computer,
B) an actuator controlled by said computer,
C) a plurality of circuit activation switches controlled by said actuator,
wherein said computer is programmed to cause said actuator to control the opening and closing of said plurality of circuit activation switches based on the time of day.

5. A portable PV modular solar generator, comprising:
A) a rechargeable battery container,
B) a plurality of wheels attached to the bottom of said rechargeable battery container,
C) at least one rechargeable battery contained inside said rechargeable battery container,
D) a power conditioning panel connected to said rechargeable battery container, and
E) at least one pivotally connected photovoltaic panel
wherein said at least one rechargeable battery is at least two rechargeable batteries, said portable PV modular solar generator further comprising at least one quick-release battery connection device for connecting said at least two rechargeable batteries.

6. The portable PV modular solar generator as in claim 5, wherein said at least one quick-release battery connection device comprises:
A) a cam clip,
B) a cam tension adjustment nut connected to said cam clip, and
C) a cam tension adjustment strap connected to said cam tension adjustment nut.

7. A portable PV modular solar generator, comprising:
A) a rechargeable battery container,
B) a plurality of wheels attached to the bottom of said rechargeable battery container,
C) at least one rechargeable battery contained inside said rechargeable battery container,
D) a power conditioning panel connected to said rechargeable battery container,
E) at least one pivotally connected photovoltaic panel, and
F) a remotely controlled drive device for positioning said portable PV modular solar generator, wherein said remotely controlled device is connected to the bottom of said portable PV modular solar generator.

8. The portable PV modular solar generator as in claim 7, further comprising a remote control unit to remotely control said remotely controlled device, said remote control unit comprising:
A) a manual setting,
B) a remote control setting, and
C) a automatic setting.

9. The portable PV modular solar generator as in claim 1, wherein said at least one photovoltaic panel is a plurality of photovoltaic panels, wherein said automatic positioning capability comprises:
A) a plurality of drive wheels,
B) a drive motor connected to said plurality of drive wheels, and
C) a computer in electrical communication with said drive motor and with said plurality of photovoltaic panels,
wherein values corresponding to generated solar energy levels are sent from each of said plurality of photovoltaic panels to said computer, wherein said computer computes an energy gradient between each of said plurality of photovoltaic panels, wherein said computer sends a signal to said drive motor to drive said drive wheels to automatically position said portable PV modular solar generator.

10. The portable PV modular solar generator as in claim 9, further comprising a mast connected to said rechargeable battery container, wherein said mast comprises a rotation bar, wherein said at least one photovoltaic panel is pivotally connected via said rotation bar.

11. The portable PV modular solar generator as in claim 9, wherein said plurality of wheels attached to the bottom of said rechargeable battery container are pivotally attached.

12. The portable PV modular solar generator as in claim 9, wherein said at least one rechargeable battery contained inside said rechargeable battery container is sixteen rechargeable batteries.

13. The portable PV modular solar generator as in claim 9, wherein said at least one rechargeable battery contained inside said rechargeable battery container is at least one lead acid battery.

14. The portable PV modular solar generator as in claim 9, wherein said at least one rechargeable battery contained inside said rechargeable battery container is at least one fuel cell.

15. The portable PV modular solar generator as in claim 9, wherein said rechargeable battery container is a waterproof battery enclosure.

16. The portable PV modular solar generator as in claim 15, further comprising a mast supported by said waterproof battery enclosure, wherein said mast comprises a rotation bar, wherein said at least one photovoltaic panel is pivotally connected via said rotation bar.

17. The portable PV modular solar generator as in claim 15, wherein said rechargeable battery container further comprises a knife switch connection.

18. The portable PV modular solar generator as in claim 9, wherein said power conditioning panel comprises at least one electrical component.

19. The portable PV modular solar generator as in claim 18, wherein said at least one electrical component comprises:
A) a charge controller electrically connected to said at least one photovoltaic panel and said at least one rechargeable battery, and
B) an inverter electrically connected to said charge controller.

20. The portable PV modular solar generator as in claim 9, wherein said power conditioning panel is waterproof.

21. The portable PV modular solar generator as in claim 9, wherein said power conditioning panel comprises:
A) a door, and
B) at least one safety switch that opens breaking an electrical circuit when said door is opened.

22. The portable PV modular solar generator as in claim 9, wherein said at least one photovoltaic panel is four photovoltaic panels.

23. The portable PV modular solar generator as in claim 9, further comprising at least one solar panel support brace wherein said at least one photovoltaic panel is supported by said at least one solar panel support brace.

24. The portable PV modular solar generator as in claim 9, further comprising an auxiliary power input device.

25. The portable PV modular solar generator as in claim 23, wherein said solar panel support brace comprises at least one spring loaded expansion bar.

26. A portable PV modular solar generator, comprising:
A) a rechargeable battery container,
B) a plurality of wheels attached to the bottom of said rechargeable battery container,
C) at least one rechargeable battery contained inside said rechargeable battery container,
D) a power conditioning panel connected to said rechargeable battery container,
E) at least one pivotally connected photovoltaic panel, and
F) a mast cap, and
G) a mast cap lid, comprising:
  1) at least one electromagnetic lock for locking said mast cap lid to said mast cap.

27. The portable PV modular solar generator as in claim 26, further comprising at least one ventilation fan attached to said mast cap lid.

\* \* \* \* \*